Oct. 9, 1951  C. W. CHILLSON ET AL  2,570,427
ROTARY SEAL
Filed Aug. 2, 1946  2 Sheets-Sheet 2
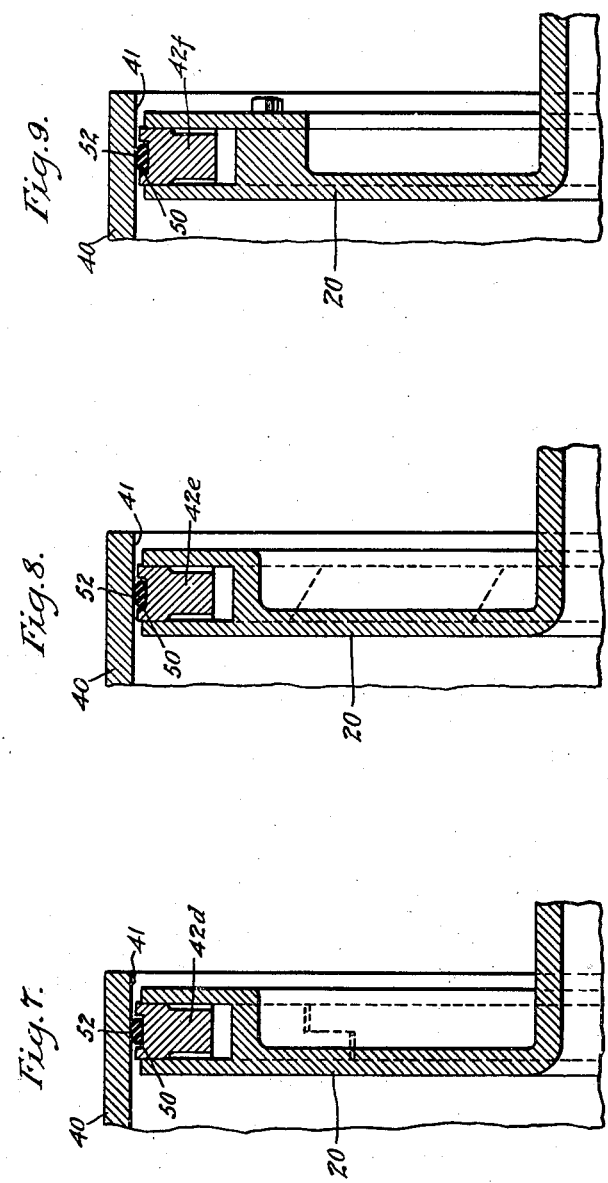
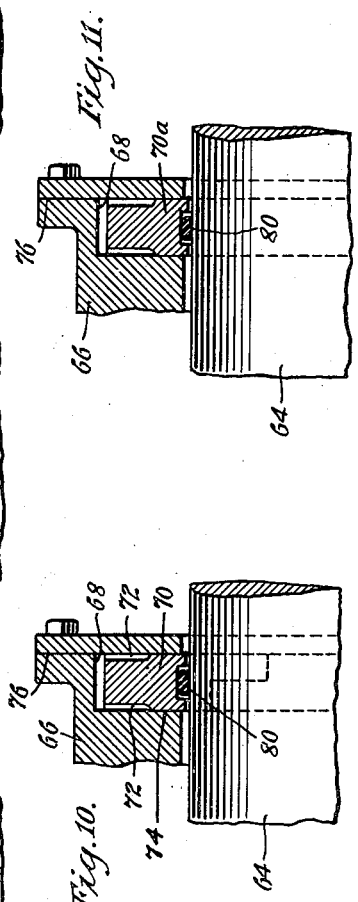
INVENTORS
Charles W. Chillson
BY Joseph M. Mergen
Godfrey B. Speir
ATTORNEY Patented Oct. 9, 1951

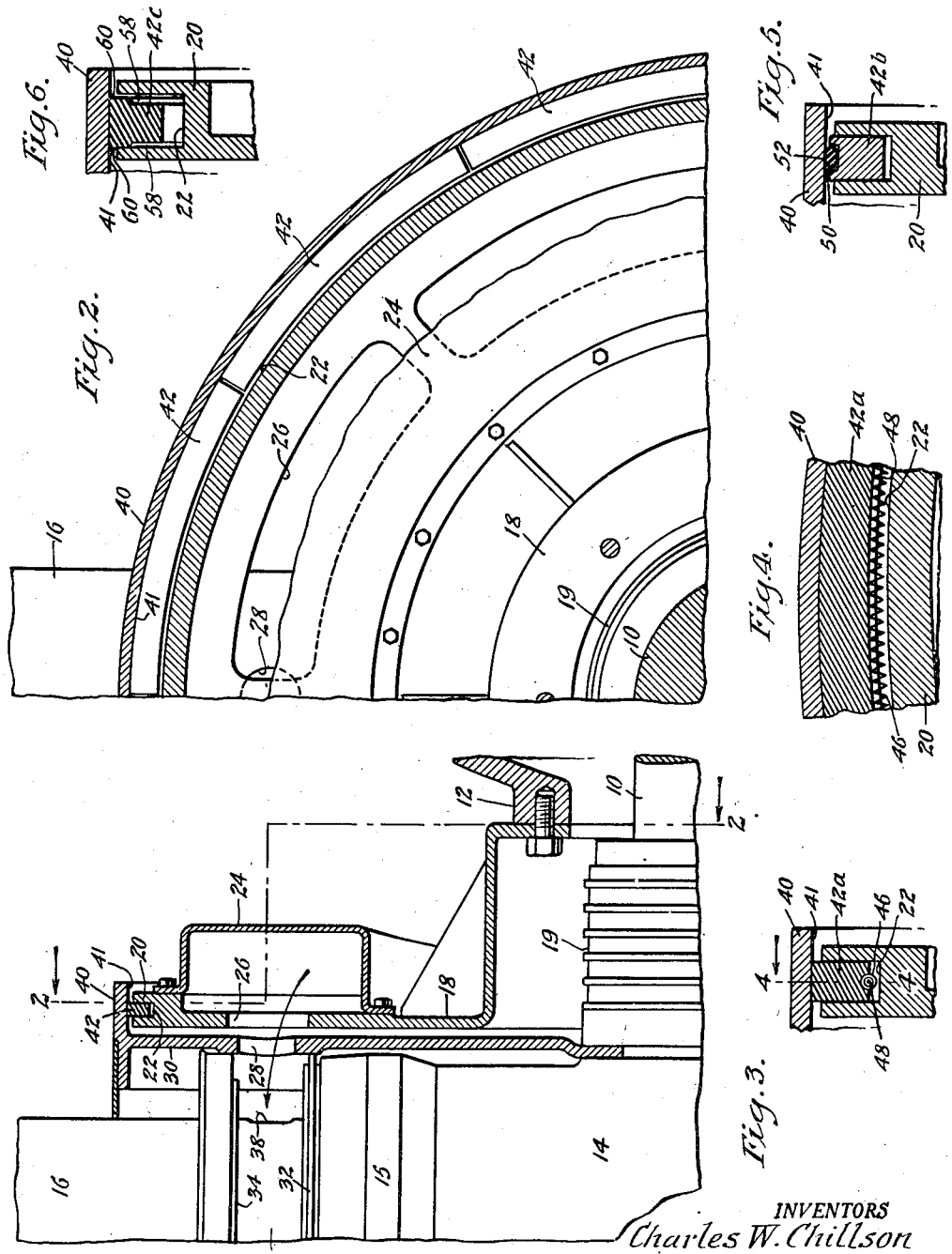

2,570,427

UNITED STATES PATENT OFFICE 2,570,427

ROTARY SEAL

Charles W. Chillson, Caldwell, and Joseph M. Mergen, Verona, N. J., assignors to Curtiss-Wright Corporation, a corporation of Delaware Application August 2, 1946, Serial No. 688,059

5 Claims. (Cl. 286—11.13)

This invention relates to rotating seals of the type wherein a grooved annular member is equipped with a ring which bears upon a cylindrical surface of a coacting member. Such seals are used to prevent the escape of gas or liquids between relatively rotating machine parts.

In this type of seal, ordinarily utilized in a seal assembly having a diameter of a few inches or less, the sealing element is a split ring which bears upon the coacting member due to the resilience of the ring. Rotary sealing contact occurs between one of the side walls of the ring and one of the side walls of the groove in the one member, while static sealing engagement occurs between a cylindrical face of the ring and the cylindrical surface of the other member. This type of seal does not necessarily depend upon centrifugal force for sealing action since the resilience of the ring enforces appropriate sealing engagement. However, if the outer member of the assembly is the cylindrical member, and is rotated, the ring rotates with it and sealing pressure against the outer member may be augmented by the action of centrifugal force.

It is an object of this invention to provide a ring seal system which can be used for relatively large diameter seal assemblies, such diameters being of the order of one to several feet, although these dimensions are not to be construed as a limitation of the size of an assembly incorporating the invention. Further objects of the invention are: to provide a ring seal arrangement which is partly or entirely dependent upon the action of centrifugal force for its operation; to provide a ring seal assembly wherein the ring is divided into a plurality of segments which are normally free but which are forced into the sealing position by the action of centrifugal force; to provide a ring seal wherein the sliding contact area is minimized, to minimize frictionally generated heat, while retaining sufficient mass in the ring for heat absorption and structural ruggedness; to provide elastic means to enforce at all times sealing engagement of the components of the assembly, to provide an auxiliary seal which will assure a relatively leakproof arrangement; and to provide an auxiliary seal of resilient material enabling the use of solid seal rings.

The above objects are accomplished by the structure and arrangement set forth in the following detailed description when read in connection with the accompanying drawings. It is to be expressly understood, however, that drawings are employed for purpose of illustration only and do not define the limits of the invention, reference being had to the appended claims for this purpose.

In the drawings,

Fig. 1 is a longitudinal elevation, partly in section, on an aeronautical propeller structure incorporating the seal of this invention;

Fig. 2 is a section on the line 2—2 of Fig. 1;

Fig. 3 is an enlarged transverse section through a portion of an alternative seal arrangement;

Fig. 4 is a section on the line 4—4 of Fig. 3; and

Figs. 5 to 11 are similar sections of portions of seal assemblies showing alternative arrangements.

Referring first to Figs. 1 and 2, I show a portion of a thermally de-iced aeronautical propeller, wherein 10 is a power shaft extending from an engine housing 12 through the conventional engine nose seal, not shown. The shaft carries a propeller hub 14 having blade sockets 15 from which propeller blades 16 extend radially for rotation on their own axes in the sockets for pitch change. Secured to the engine housing 12 is an annular stationary member 18, circular at its periphery as at 20 and having formed in this outer periphery a rectangular annular groove 22. The member 18 forms a housing, embracing slip rings 19 forming part of the propeller. The rear face of the member 18 has a manifold 24 secured thereto into which hot air or other hot gaseous medium is fed. Openings 26 in the member 18 allow for flow of the hot medium therethrough, and through holes 28 in a diaphragm member 30 secured to the propeller. Hot gas passing from the opening 26 to the opening 28 may pass inwardly between the slip rings 19 and the member 18, where leakage is prevented by the engine nose seal. It may also pass outwardly, where leakage is minimized by the seal which will be described shortly. Each propeller blade 16 is provided with rings 32 and 34 which define around the propeller blade a channel 36 into which the hot gas may flow from the openings 28. Each propeller blade shank, at a portion lying between the rings 32 and 34, is provided with one or more openings 38 to allow for the flow of the hot gas into the propeller blades and thence outwardly along the propeller blades to heat them and to remove ice therefrom or to prevent the formation of ice thereon.

The diaphragm member 30 is provided at its outer margin with a cylinder 40 whose inner surface 41 is substantially concentric with the member 20 and lies radially in closely spaced relation thereto. Within the groove 22 a seal ring 42 is disposed, this ring being fitted to the groove so that one or the other of its side or plane faces will have intimate sealing contact with the side or plane faces of the groove. Some axial clearance is allowed between the groove and the ring so that the ring may rotate freely with respect to the grooved member. The outer convex face or rim of the ring bears upon the cylinder surface 41 for sealing engagement therewith during rotation of the member 30. The ring 42 is intended to rotate with the cylinder 40 but is capable of axial sliding therealong.

In the form of the invention shown in Figs. 1 and 2, the ring 42 comprises in its entirety a plurality of segments of rectangular cross-section disposed in end to end relation around the groove 22, the total arcuate embracement of all of the segments being slightly less than 360 degrees in order that the segments will have individual freedom to move inwardly and outwardly of the groove 22 during operation, and in order that any possibility of binding of the segments with respect to each other is minimized. In this arrangement, the cylinder 40 rotates with the propeller and there will be light frictional engagement between one or more of the segments 42 and the cylinder surface 41. The engagement will enforce joint rotation of all of the segments with the cylinders, and as centrifugal force acts upon the segments as they rotate together, the segments will be thrown outwardly into firm sealing engagement with the surface 41. The use of a ring composed of a plurality of segments is particularly desirable where the diameter of the rotating seal is large compared with the cross-sectional dimensions of the seal components. The segments are comparatively easy to manufacture and replace, and may be much more easily handled than a very large ring having small cross-section. Furthermore, the action of centrifugal force upon each segment will hold it in firm sealing engagement with the embracing ring and will eliminate any seal leakage which might be caused, when a complete ring is used, by distortion in the ring. The ends of the segments 42 may be radial as shown or may be stepped so that adjacent segments interleave with one another to prevent end gap leakage.

The seal above described, along with the alternative arrangements to be described, are capable of sealing action in either direction—that is, if the pressure fluid is applied from one side, the ring will move to the opposite face of the groove and vice versa. Since the rings, or the ring segments 42, are free for radial movement in the groove 22, slight eccentricity between the members 20 and 40 will not interfere with the effectiveness of the seal since the ring elements will at all times bear upon the member opposite the groove. Upon relative axial movement between the members 20 and 40, the ring or ring elements may move axially along the member 40 with comparative freedom so that effective sealing will be maintained.

In the alternative arrangement shown in Figs. 3 and 4, a helical spring 46 may be disposed beneath the several segments 42a, this spring exerting outward pressure on the segments to hold them in initial contact with the outer member 40. The spring 46 preferably will bear only upon the bottom faces of the segments 42a and will have clearance from the bottom of the groove 22 to permit free rotation of the ring assembly with respect to the member 20. Since the spring 46 is long and slender, it may be braced by a fairly stiff wire 48 running centrally through the spring coils to allow easier handling of the spring unit when it and the segments are assembled in the member 20 prior to assembly of the cylinder 40 thereon. The inner arcuate surfaces of the ring or segments 42a may be suitably grooved to center the spring 46 between the lateral faces of the ring.

In Fig. 5, an arrangement is shown wherein the seal ring 42b (either a continuous ring, a split ring, or a segmental ring) is provided with a peripheral groove 50 into which is fitted a packing ring 52 of resilient material such as rubber or an equivalent thereof. This packing ring engages the cylinder surface 41 and seals the ring 42b against the surface 41. In a manner well known in the art, the ring 42b may move axially along the member 40 and the packing 52 of initially circular section rolls between the bottom of the groove 50 and the surface of the ring 41 while holding the elements from relative rotation. The packing 52, when assembled on a continuous ring, and when inserted within the member 41, is compressed slightly to oval form to afford effective initial sealing engagement. If this type of packing is used with the segmental ring construction, centrifugal force will hurl the segments outwardly to compress the packing 52. As indicated above, a packing ring such as 52 may be used with a solid ring in which case the distance between the cylindrical surface 41 and the member 40 and the bottom of the groove 50, will be slightly less than the sectional diameter of the packing 52 when it is not compressed.

In Fig. 6, the ring 42c, which may be either split, continuous, or segmental, is relieved on its opposite walls as at 58, leaving narrow outer lateral rims for engagement with outer portions of the side walls of the grooves 22. The side relief portions have the effect of reducing the sealing area between ring and groove walls, consequently reducing the frictional contact area and reducing the amount of heat generated by the rubbing of the ring upon the groove wall. If the ring seal is to seal against some certain fluid pressure, said pressure will act upon the entire loaded side wall of the ring, urging it into sealing engagement with the groove wall. If the entire side of the ring is in engagement with the groove wall as in the arrangement of Fig. 5, the load on the ring will be equal to the unit pressure times the side wall area of the ring. In the arrangement of Fig. 6, part of the fluid load on the pressure side of the ring is compensated by the same pressure acting upon the relieved portion of the ring whereupon the total sealing pressure exerted on the ring is only equal to the area of the rim 60 times the unit pressure. This force, obviously being less than the force heretofore mentioned, will cause the generation of considerably less heat due to friction. However, the mass of the ring 42c is substantially the same as the mass of the rings previously mentioned so that that heat which is generated may be more easily absorbed and dissipated causing the seal ring to operate at reduced temperature. Furthermore, the extra material between the relieved portions 58 endows the ring with a greater strength and ruggedness than if the thickness of the ring were merely as great as the width of the face 60.

In the case of single split rings having relieved portions such as 58, the thickness of the ring is sufficient to yield considerable spring effect to enforce sealing contact between the ring periphery and the cylinder surface 41. When segmental rings are used, the construction of Fig. 6 is desirable so that the segments will withstand normal handling without breakage. These segments frequently are made of a friable material such as graphite or carbon so that the additional mass of the segment is highly desirable.

In the arrangement shown in Fig. 7, I have shown a split ring 42d, provided with side reliefs similar to those of Fig. 6, and provided with a resilient packing as shown in Fig. 5.

In Fig. 8, the ring 42e is shown as comprising a plurality of segments each having side reliefs in the same fashion as taught in Fig. 6 and having an embracing packing of the same character as that shown in Fig. 5.

In Fig. 9, I show a continuous ring 42f, freely slidable with the member 40 but having resilient packing such as that shown in Fig. 5, to provide a fluid tight seal between the ring and the outer member. In this arrangement, the ring 42f will rotate with the member 40 but may move axially with respect thereto. The ring 42f also includes side relief portions as taught in Fig. 6.

In Fig. 10, I show an inverted seal arrangement wherein a smooth inner member or shaft 64 is embraced by a member 66 having an annular groove 68 substantially concentric with the shaft. Within the groove 68 is disposed a split seal ring 70, the ring having contracting resilience to firmly embrace the shaft 64. The side walls of the ring 70 are relieved as at 72 so that narrow sealing faces 74 are provided at the inner portions of the ring for sealing engagement with the innermost portions of the side walls of the groove 68. The ring portion between the reliefs 72 gives added stiffness to the ring so that it may hold firmly around the shaft 64 for sealing engagement therewith. The ring 70 is slidable along the shaft but rotates therewith, and a narrow efficient rotating seal exists between the groove side wall and the ring face 74. The operation of the seal ring for its sealing function is similar to that described for Fig. 6 except that the parts are inverted. The member 66 may be split if desired as at 76 to allow assembly of the seal ring 70 in the member. In this arrangement, either or both of the members 64 or 66 may rotate.

In the arrangement shown in Fig. 11, the components are similar to those in Fig. 10 except that the ring 70a is a continuous ring having a loose fit on the shaft 64. The bore of the ring 70a is grooved as at 78, and a toroidal packing 80 is disposed within the groove 78 and seats against the bottom of the groove and against the shaft 64 to afford a seal between the ring and the shaft while permitting axial movement of the ring along the shaft.

In the arrangements of Figs. 10 or 11, the ring 70 or 70a may be made as a plurality of segments, embraced by a garter spring to hold them in firm contact with the shaft element.

The dimensional latitude for practicing the teachings of this invention is great, as will be apparent to those skilled in the art, and no limitation is to be implied from this specification as to the most suitable dimensions for use in its practice. No limitation is to be implied with respect to usage of the seal. The thermally anti-iced propeller is merely chosen as an appropriate environment.

Choice of material will vary with the seal problem to be solved, but in general, materials which will have minimum wear characteristics are most desirable.

Though several modifications of the invention are shown, it is to be understood that the invention may be applied in various forms and in various environments. Changes may be made in the arrangements shown without departing from the spirit of the invention. Reference should be had to the appended claims for definitions of the limits of the invention.

What is claimed is:

1. In a seal between relatively rotating parts, a member having an outwardly facing annular groove therein, a ring unit of hard substantially non-deformable material fitted to said groove to rotate relative to said member and having a side portion in sealing, relatively rotating engagement with a side portion of said groove, a yieldable annular packing engaging the outer rim of said ring unit, and a cylindrical member embracing and substantially concentric with said grooved member, said yieldable annular packing sealably engaging the surface of said cylindrical member, said ring comprising a plurality of segments, said cylindrical member being rotated whereby said segments are centrifugally urged toward the cylindrical member surface.

2. In a seal between relatively rotating parts, a circular member having a circular open groove therein the cross-section of said groove being substantially rectangular and having greater depth, radially, than width, axially; a ring unit of hard substantially non-deformable material fitted to said groove to rotate relative to said member, said ring having a cross-section characterized by greater depth, radially, than width, axially, said ring being further characterized by having relieved side portions having annular sealing bands for sealing contact with both the side faces of said member groove, and being further characterized by having a substantially rectangular groove in that circumferential face of the ring facing away from said member, a cylindrical member substantially concentric with said grooved member, one member embracing the other in clearance relation, and a yieldable annular packing disposed within said ring groove, opposite sides of said packing engaging the surface of said cylindrical member and the bottom surface of said ring groove and being free of contact with both end faces of said ring groove.

3. In a seal between relatively rotating parts, a circular member having a circular open groove therein the cross-section of said groove being substantially rectangular and having greater depth, radially, than width, axially; a ring unit of hard substantially non-deformable material fitted to said groove to rotate relative to said member, said ring having a cross-section characterized by greater depth, radially, than width, axially, said ring being further characterized by having relieved side portions having annular sealing bands for sealing contact with both the side faces of said member groove, and being further characterized by having a substantially rectangular groove in that circumferential face of the ring facing away from said member, a cylindrical member substantially concentric with said grooved member, one member embracing the other in clearance relation, and a yieldable annular packing disposed within said ring groove, opposite sides of said packing engaging the surface of said cylindrical member and the bottom surface of said ring groove and being free of contact with both end faces of said ring groove, said ring comprising a plurality of segments in substantially end-to-end relation whereby said segments may move relatively in an axial direction to assure sealing with the side walls of the member during relative rotation.

4. In a seal between relatively rotating parts, a circular member having a circular open groove therein the cross-section of said groove being substantially rectangular and having greater depth, radially, than width, axially; a ring unit of hard substantially non-deformable material fitted to said groove to rotate relative to said member, said ring having a cross-section characterized by greater depth, radially, than width, axially, said ring being further characterized by having relieved side portions having annular sealing bands for sealing contact with both the side faces of said member groove, and being further characterized by having a substantially rectangular groove in that circumferential face of the ring facing away from said member, a cylindrical member substantially concentric with said grooved member, one member embracing the other in clearance relation, and a yieldable annular packing disposed within said ring groove, opposite sides of said packing engaging the surface of said cylindrical member and the bottom surface of said ring groove and being free of contact with both end faces of said ring groove, said ring comprising a split annulus.

5. In a seal between relatively rotating parts, a circular member having a circular open groove therein the cross-section of said groove being substantially rectangular and having greater depth, radially, than width, axially; a ring unit of hard substantially non-deformable material fitted to said groove to rotate relative to said member, said ring having a cross-section characterized by greater depth, radially, than width, axially, said ring being further characterized by having relieved side portions having annular sealing bands for sealing contact with both the side faces of said member groove, and being further characterized by having a substantially rectangular groove in that circumferential face of the ring facing away from said member, a cylindrical member substantially concentric with said grooved member, one member embracing the other in clearance relation, and a yieldable annular packing disposed within said ring groove, opposite sides of said packing engaging the surface of said cylindrical member and the bottom surface of said ring groove and being free of contact with both end faces of said ring groove, said ring comprising a complete annulus.

CHARLES W. CHILLSON.
JOSEPH M. MERGEN.

REFERENCES CITED

The following references are of record in the file of this patent:

UNITED STATES PATENTS

| Number | Name | Date |
|---|---|---|
| 1,859,436 | Durdin | May 24, 1932 |
| 1,986,285 | Pollitz | Jan. 1, 1935 |
| 2,259,422 | Karlberg | Oct. 14, 1941 |
| 2,372,103 | Morton | Mar. 20, 1945 |
| 2,420,039 | Frisby | May 6, 1947 |
| 2,420,047 | Marien | May 6, 1947 |